(12) United States Patent
Azuma et al.

(10) Patent No.: US 12,061,810 B2
(45) Date of Patent: Aug. 13, 2024

(54) INFORMATION PROCESSING APPARATUS AND METHOD IN HYBRID CLOUD SYSTEM INCLUDING HOSTS PROVIDED IN CLOUD AND STORAGE APPARATUS PROVIDED AT A LOCATION OTHER THAN THE CLOUD

(71) Applicant: Hitachi, Ltd., Tokyo (JP)

(72) Inventors: Yuichi Azuma, Tokyo (JP); Tomohiro Morimura, Tokyo (JP); Shin Nishihara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 18/103,348

(22) Filed: Jan. 30, 2023

(65) Prior Publication Data

US 2023/0176760 A1  Jun. 8, 2023

Related U.S. Application Data

(63) Continuation of application No. 17/199,059, filed on Mar. 11, 2021, now Pat. No. 11,599,289.

(30) Foreign Application Priority Data

Jun. 19, 2020  (JP) .................................. 2020-105719

(51) Int. Cl.
*G06F 3/06* (2006.01)
*H04L 67/1095* (2022.01)
(52) U.S. Cl.
CPC .......... *G06F 3/0644* (2013.01); *G06F 3/0604* (2013.01); *G06F 3/0689* (2013.01); *H04L 67/1095* (2013.01)
(58) Field of Classification Search
CPC .... G06F 3/0644; G06F 3/0604; G06F 3/0689; H04L 67/1095
See application file for complete search history.

(56) References Cited

U.S. PATENT DOCUMENTS 8,849,758 B1  9/2014 Sivasubramanian et al.
2011/0119509 A1  5/2011 Yanagawa et al.
(Continued)

FOREIGN PATENT DOCUMENTS

JP  2016103113 A  6/2016

OTHER PUBLICATIONS

Extended European Search Report, Application No. 21162036.4, dated Sep. 23, 2021, in 9 pages.

*Primary Examiner* — Ryan Bertram
(74) *Attorney, Agent, or Firm* — Procopio, Cory, Hargreaves & Savitch LLP

(57) ABSTRACT

An information processing apparatus and method capable of minimizing influences affecting business activities and dynamically changing the configuration of a storage apparatus in response to scale-out of hosts are proposed. The information processing apparatus for managing the configuration of the storage apparatus which constitutes a hybrid cloud system is provided with a data acquisition unit and a data copy management unit; and if the data acquisition unit detects the scale-out of the hosts and determines that a first volume, which stores data from the hosts, in the storage apparatus has a high load, the data acquisition unit issues an instruction to the data copy management unit to copy the data and the data copy management unit issues an instruction to the storage apparatus, in accordance with the instruction from the data acquisition unit, to copy the data, regarding which the access frequency from each host is high, to a second volume and to copy the data, regarding which the access frequency from a specified host is high, to a third volume.

10 Claims, 15 Drawing Sheets

(56) References Cited

U.S. PATENT DOCUMENTS

| | | |
|---|---|---|
| 2011/0314220 A1 | 12/2011 | Matsumura et al. |
| 2013/0097118 A1 | 4/2013 | Jenkins et al. |
| 2014/0351208 A1 | 11/2014 | Jenkins et al. |
| 2015/0254088 A1 | 9/2015 | Chou et al. |
| 2016/0156568 A1 | 6/2016 | Naganuma et al. |
| 2016/0259725 A1 | 9/2016 | Nishimoto et al. |
| 2017/0285983 A1 | 10/2017 | Matsubara et al. |
| 2019/0220214 A1 | 7/2019 | Mio et al. |
| 2019/0250819 A1 | 8/2019 | Jain et al. |
| 2021/0263887 A1 | 8/2021 | Malecki et al. |

FIG. 4

DATA ACCESS FREQUENCY MANAGEMENT TABLE

| DATA ID | THE NUMBER OF TIMES OF ACCESSES |
|---|---|
| #1 | 1 |
| #2 | 10000 |
| #3 | 20 |
| #4 | 200 |
| ... | ... |

DATA ACCESS LOCALIZATION MANAGEMENT TABLE

| HOST ID | DATA ID | THE NUMBER OF TIMES |
|---|---|---|
| Host #1 | 1 | 100 |
| Host #2 | 2 | 10 |
| Host #3 | 10 | 30 |
| Host #4 | 1 | 10000 |
| ... | ... | ... |

STORAGE ROUTING MANAGEMENT TABLE (1)

| # | HOST ID | iSCSI name | iSCSI Target | PROCE-SSOR ID | CACHE ID | VOLUME ID |
|---|---|---|---|---|---|---|
| #1 | Host #1 | | | #1 | #20 | 1 |
| #2 | Host #1 | | | #1 | #20 | 1 |
| #3 | Host #2 | | | | | 1 |
| #4 | Host #2 | | | | | 0 |
| #5 | Host #3 | | | | | 1 |
| ... | ... | ... | ... | ... | ... | ... |

STORAGE ROUTING MANAGEMENT TABLE (2)

| # | HOST ID | HOST-SIDE WWN | STORAGE-SIDE WWN | PROCE-SSOR ID | CACHE ID | VOLUME ID |
|---|---------|---------------|------------------|---------------|----------|-----------|
| #1 | Host #1 | | | #1 | #20 | 1 |
| #2 | Host #1 | | | #1 | #20 | 1 |
| #3 | Host #2 | | | | | 1 |
| #4 | Host #2 | | | | | 0 |
| #5 | Host #3 | | | | | 1 |
| ... | ... | ... | ... | ... | ... | ... |
| 35AX | 35BX | 35CX | 35DX | 35EX | 35FX | 35GX |

FIG. 7

DATA COPY MANAGEMENT TABLE

| DATA ID | COPIED EXECUTION FLAG |
|---|---|
| #1 | 1 |
| #2 | 1 |
| #3 | 1 |
| #4 | 0 |
| #5 | 1 |
| #6 | 0 |
| ... | ... |

36A   36B

INFORMATION PROCESSING APPARATUS AND METHOD IN HYBRID CLOUD SYSTEM INCLUDING HOSTS PROVIDED IN CLOUD AND STORAGE APPARATUS PROVIDED AT A LOCATION OTHER THAN THE CLOUD

TECHNICAL FIELD

The present invention relates to an information processing apparatus and method and is suited for application to, for example, a hybrid cloud system.

BACKGROUND ART

In recent years, much attention has been focused on hybrid clouds. A hybrid cloud is a cloud system configured by combining a public cloud, a private cloud, on-premises, and so on. For example, an initial cost can be curbed while maintaining safety of data by using server apparatuses in the public cloud as hosts and using a storage apparatus at the on-premises as the storage apparatus.

CITATION LIST

Patent Literature

PTL 1: Japanese Patent Application Laid-Open (Kokai) Publication No. 2016-103113

SUMMARY OF THE INVENTION

Problems to be Solved by the Invention

Meanwhile, the public cloud is typically equipped with an auto-scale function that increases/decreases the number of cloud servers according to server load, so that the storage apparatus side is also required to dynamically change its configuration so as to enhance or recover the performance in response to dynamic scale-out/scale-in of the cloud servers.

In order to satisfy the above-described requirement, PTL 1 discloses that if a sign indicating load growth of a DB server is detected, the performance of the DB server side is enhanced in response to scale-out of host servers by performing scale-up of the DB servers and switching between a primary side and a secondary side.

Under this circumstance, resources of a storage apparatus for which a dynamic configuration change is required are ports, processors, a cache memory, and a logical volume(s) (disk(s)). In this case, if the storage apparatus does not have a redundant configuration like the DB servers of PTL 1, the ports, the processors, and the cache memory can be changed immediately, while the logical volume(s) requires replication of data and it is thereby difficult to deal with the scale-out promptly.

There are technology to copy the entire logical volume on the background and without stopping and technology to replicate only the updated data; however, these technologies are premised on the replication of all the data within the logical volume and no consideration is paid to access frequency of individual pieces of the data.

Accordingly, when these existing technologies are used as a method for enhancing the performance of the storage apparatus in response to the scale-out of the hosts, wasteful consumption of the storage resources such as a CPU (Central Processing Unit) and a memory will occur. This results in problems such as a considerable amount of time required for the execution of the replication itself and adverse influences affecting business activities which use that storage apparatus.

The present invention was devised in consideration of the above-described circumstances and aims at proposing an information processing apparatus and method capable of minimizing the influences affecting the business activities and dynamically changing the configuration of the storage apparatus in response to the scale-out of the hosts.

Means to Solve the Problems

In order to solve the above-describe problem, provided according to an aspect of the present invention is an information processing apparatus in a hybrid cloud system including hosts provided in a cloud and a storage apparatus which is provided at a location other than the cloud and from and to which the hosts read and write data, wherein the information processing apparatus manages a configuration of the storage apparatus and includes: a data acquisition unit that monitors occurrence of scale-out of the hosts in the cloud, manages access frequency from the hosts to each piece of the data stored in the storage apparatus, and acquires storage information about a load on the storage apparatus from the storage apparatus; and a data copy management unit that manages copying of the data in the storage apparatus; wherein if the data acquisition unit detects the scale-out of the hosts and determines based on the storage information that a first volume, which stores the data from the hosts, in the storage apparatus has a high load, the data acquisition unit issues an instruction to the data copy management unit to copy the data; and wherein if the data copy management unit receives the instruction from the data acquisition unit to copy the data stored in the first volume, the data copy management unit issues an instruction to the storage apparatus, on the basis of the access frequency from the hosts to each piece of the data stored in the first volume, to copy the data, regarding which the access frequency from each host to the data is high, to a second volume which is different from the first volume and copy the data, regarding which the access frequency from a specified one of the hosts is high, to a third volume which is different from the first volume and the second volume.

Also, provided according to another aspect of the present invention is an information processing method executed by an information processing apparatus in a hybrid cloud system including hosts provided in a cloud and a storage apparatus which is provided at a location other than the cloud and from and to which the hosts read and write data, wherein the information processing apparatus manages a configuration of the storage apparatus and includes: a data acquisition unit that monitors occurrence of scale-out of the hosts in the cloud, manages access frequency from the hosts to each piece of the data stored in the storage apparatus, and acquires storage information about a load on the storage apparatus from the storage apparatus; and a data copy management unit that manages copying of the data in the storage apparatus; wherein the information processing method includes: a first step, which is executed by the data acquisition unit when detecting the scale-out of the hosts and determining based on the storage information that a first volume, which stores the data from the hosts, in the storage apparatus has a high load, of issuing an instruction to the data copy management unit to copy the data; and a second step, which is executed by the data copy management unit in accordance with the instruction from the data acquisition unit, of issuing an instruction to the storage apparatus, on the basis of the access frequency from the hosts to each piece of the data stored in the first volume, to copy the data, regarding which the access frequency from each host to the data is high, to a second volume which is different from the first volume and copy the data, regarding which the access frequency from a specified one of the hosts is high, to a third volume which is different from the first volume and the second volume.

If the information processing apparatus and method according to the present invention is employed, only the data with high access frequency from the hosts is selectively replicated, so that it is possible to curb wasteful consumption of the storage resources required for the replication and promptly replicate the data as compared to the existing technology which replicates all the pieces of data.

Advantageous Effects of the Invention

The information processing apparatus and method capable of minimizing the influences affecting the business activities and dynamically changing the configuration of the storage apparatus in response to the scale-out and scale-in of the hosts can be realized according to the present invention.

BRIEF DESCRIPTION OF DRAWINGS

FIG. 4 is a chart illustrating a configuration example of a data access frequency management table;

FIG. 5 is a chart illustrating a configuration example of a data access localization management table;

FIG. 6A is a chart illustrating a configuration example of a storage routing management table;

FIG. 6B is a chart illustrating a configuration example of the storage routing management table;

FIG. 7 is a chart illustrating a configuration example of a data copy management table;

DESCRIPTION OF EMBODIMENTS

One embodiment of the present invention will be described below in detail with reference to the drawings.

Figure 1:
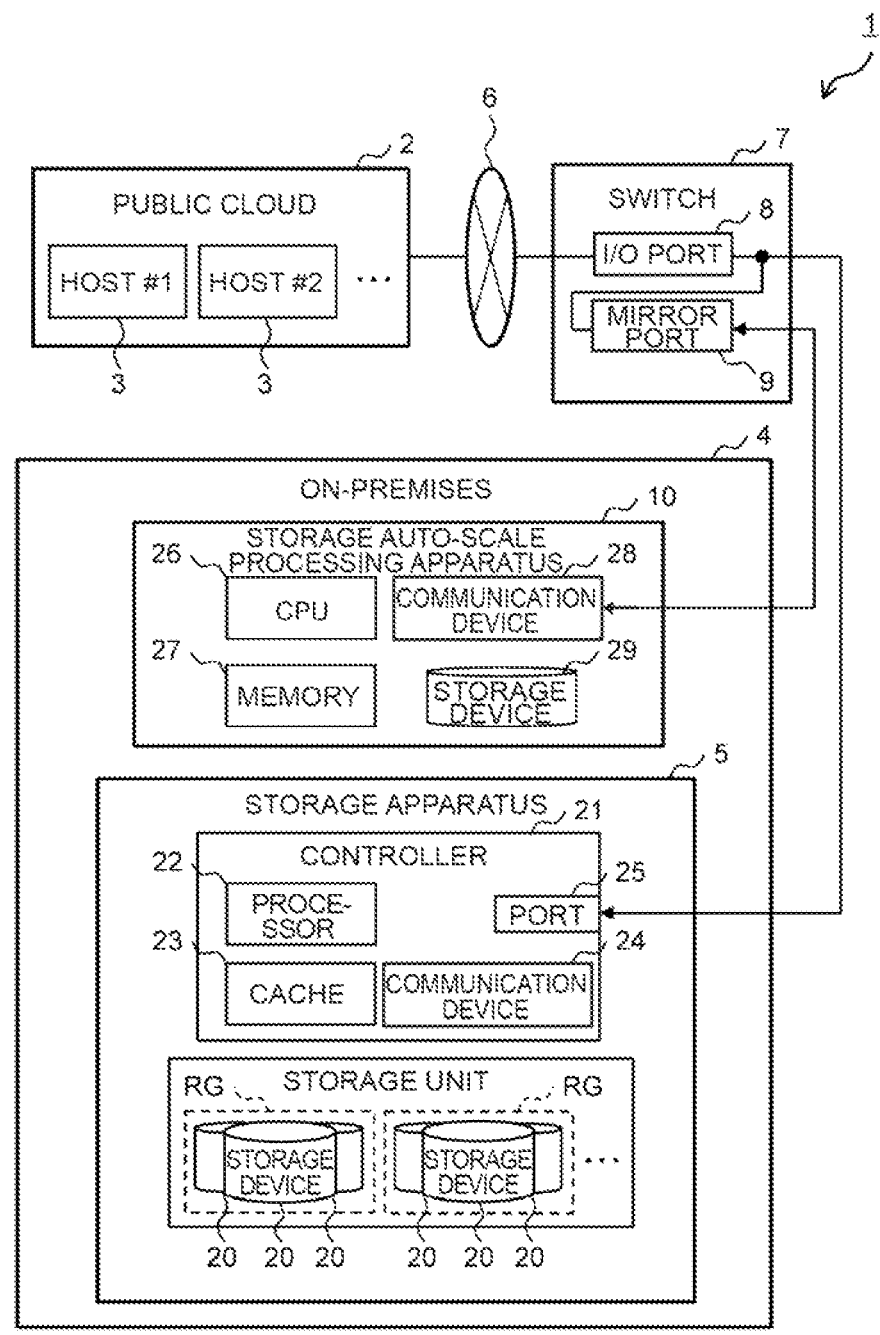
FIG. 1 is a block diagram illustrating the configuration of a hybrid cloud system according to this embodiment.

(1) Configuration of Hybrid Cloud System According to this Embodiment (1-1) Hardware Configuration of Hybrid Cloud System Referring to FIG. 1, the reference numeral 1 represents a hybrid cloud system according to this embodiment as a whole. This hybrid cloud system 1 is a cloud system in which hosts 3 in a public cloud 2 and a storage apparatus 5 at on-premises 4 are combined together.

In this hybrid cloud system 1, the hosts 3 and the storage apparatus 5 are coupled to each other via a network 6 and an I/O (Input/Output) port 8 of a switch 7. Furthermore, the hosts 3 are also routed sequentially through the network 6 and the I/O port 8 and a mirror port 9 of the switch 7 to be coupled to a storage auto-scale processing apparatus 10 at the on-premises 4.

The host 3 is an information processing apparatus equipped with information processing resources such as a CPU and a memory and is, for example, a general-purpose server apparatus. However, the above-described host 3 may be a virtual machine embodied by a virtualization program mounted in a physical server apparatus. Specified application software is mounted in the host 3. Then, the host 3 executes specified arithmetic processing on the basis of this application software and reads/writes necessary data from/to the storage apparatus 5 at the on-premises 4 via the network 6 and the switch 7.

The storage apparatus 5 is configured by including a plurality of storage devices 20 and a controller 21 which controls reading/writing of data from/to these storage devices 20.

Figure 2:
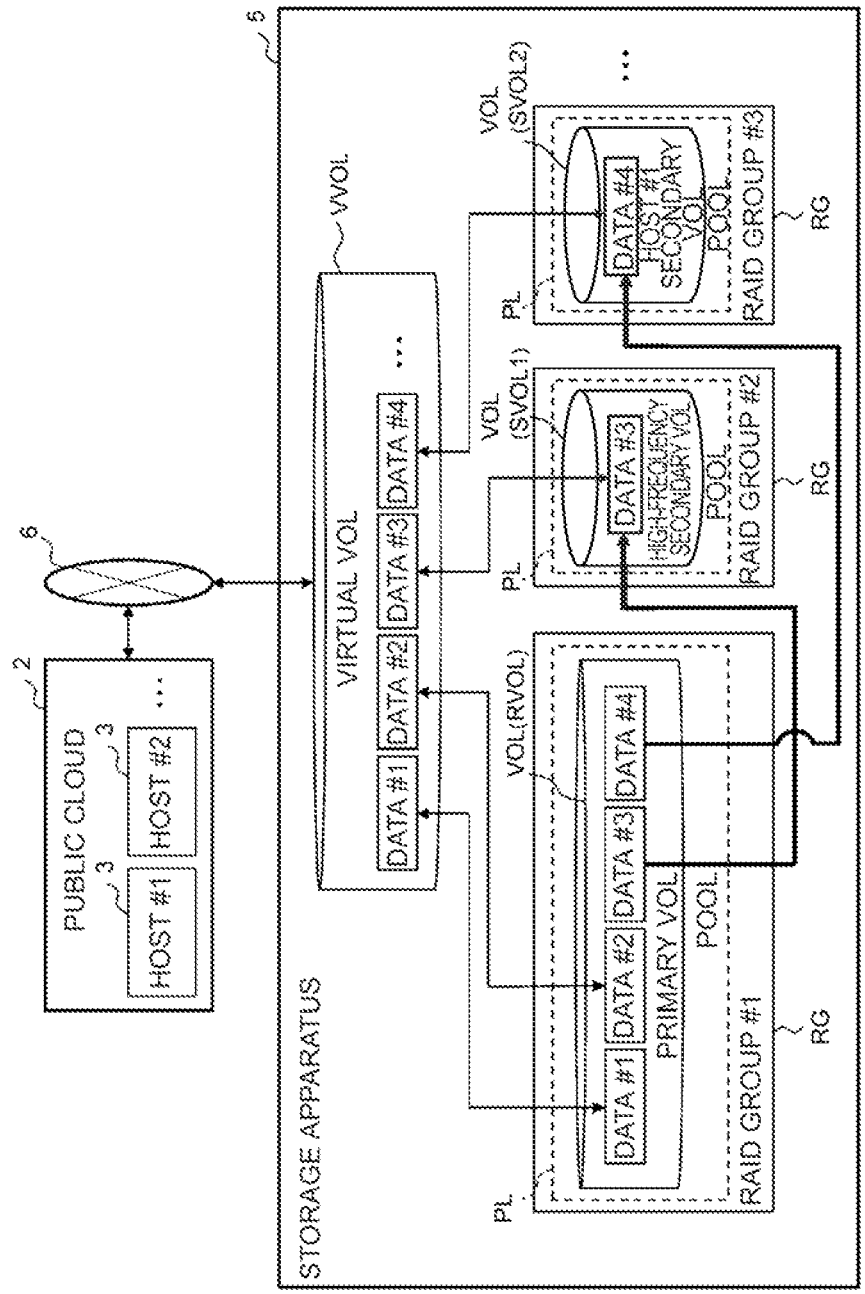
FIG. 2 is a block diagram for explaining a volume configuration in a storage apparatus.

The storage device 20 is formed of, for example, a hard disk drive, an SSD (Solid State Drive), or a flash memory. One or a plurality of storage devices are managed as a RAID (Redundant Arrays of Inexpensive Disks) group RG; and storage areas which are respectively provided by the respective storage devices 20 which constitute one RAID group RG are collectively managed as one pool PL as illustrated in FIG. 2.

One or a plurality of logical volumes (hereinafter referred to as an "actual volume(s)") VOL which is/are composed of a storage area(s) that is part of the relevant pool PL is/are set respectively in each pool PL. Then, these actual volumes VOL are associated with virtual logical volumes defined within the storage apparatus 5 (hereinafter referred to as a "virtual volume(s)") VVOL and such virtual volumes VVOL are provided as storage areas for reading/writing data to the host(s) 3 in the public cloud 2.

Each of the actual volume VOL and the virtual volume VVOL is assigned a unique identifier (hereinafter referred to as a "volume ID"). Furthermore, the respective storage areas in the actual volumes VOL and the virtual volumes VVOL are managed by using blocks of specified size as units. In the following explanation, blocks of the actual volumes VOL will be referred to as actual blocks and blocks of the virtual volumes VVOL will be referred to as virtual blocks.

Then, data is read/written from the host 3 from/to a virtual volume VVOL by using, as an address, a combination of the volume ID of the relevant virtual volume VVOL and a unique number (LBA: Logical Block Address) of the relevant virtual block, which is assigned to each virtual block in the relevant virtual volume VVOL, and designating that address.

When data is written to a virtual volume VVOL, an actual block is dynamically allocated from an actual volume VOL, which is associated with that virtual volume, to a virtual block designated as a destination to write that data in the virtual volume VVOL and the data is stored in that actual block.

The correspondence relationship between a virtual block in a virtual volume VVOL and an actual block allocated to that virtual block is managed by the controller 21. When a read access is made to a virtual volume VVOL, the controller 21 reads data which is stored in an actual block associated with a virtual block, which is a read access destination, of that virtual volume VVOL and transfers the data to the host 3 which is a read access source, so that the host 3 can acquire that data.

Furthermore, the controller 21 can freely switch the correspondence relationship between virtual blocks and actual blocks. Therefore, by copying data such as "data #3" or "data #4" in FIG. 2, which is stored in an actual block associated with a virtual block in a virtual volume VVOL, to another actual volume VOL and then switching the corresponding block of that virtual block to a data copy destination actual block in a data copy destination actual volume VOL, the access destination of that data can be switched to the copied data without letting the host 3 become conscious of it.

Meanwhile, the controller 21 is configured by including a plurality of processors 22, a cache memory 23, and a communication device 24. The processor 22 is a device for controlling reading/writing of data from/to the storage devices 20 in response to an I/O command from the host 3. Furthermore, the cache memory 23 is configured of a semiconductor memory and is used to temporarily retain data to be read from, or written to, the storage devices 20.

The communication device 24 is configured of, for example, an NIC (Network Interface Card) and performs protocol control when communicating with the host 3 via the network 6. Communications between the host 3 and the communication device 24 are performed via a port 25 allocated to the relevant host 3 among a plurality of ports 25 provided in the controller 21.

The storage auto-scale processing apparatus 10 at the on-premises 4 is an information processing apparatus having a function that changes the number of the ports 25 and the processors 22 of the storage apparatus 5 allocated to the hosts 3, the capacity of the cache memory 23, and/or the configuration of the actual volumes VOL in accordance with the scale-out (an increase of the number of the hosts which execute the corresponding processing) or the scale-in (a decrease of the number of the hosts which execute the corresponding processing) in the public cloud 2 (that is, manages the configuration of the storage apparatus 5).

This storage auto-scale processing apparatus 10 is configured by including information processing resources such as a CPU (Central Processing Unit) 26, a memory 27, a communication device 28, and a storage device 29. The CPU 26 is a device having a function that controls the operation of the entire storage auto-scale processing apparatus 10. Furthermore, the memory 27 is configured of, for example, a volatile semiconductor memory and is used as a work memory for the CPU 26. The communication device 28 is configured of, for example, an NIC and performs protocol control when communicating with the host 3 via the network 6.

The storage device 29 is configured of, for example, a hard disk drive and is used to store and retain various kinds of programs and data which should be saved for a long period of time. As the programs stored in the storage device 29 are loaded to the memory 27 upon the activation of the storage auto-scale processing apparatus 10 or whenever necessary and the CPU 26 executes the programs which are loaded to the memory 27, various kinds of processing is executed as the entire storage auto-scale processing apparatus 10 as described later.

With the hybrid cloud system 1 having the above-described configuration, an I/O command which is output from the host 3 is transmitted to the storage apparatus 5 via the network 6 and the I/O port 8 of the switch 7 and reading/writing of data according to that I/O command is executed at the storage apparatus 5.

Furthermore, the above-described I/O command is also transmitted to the storage auto-scale processing apparatus 10 via the mirror port 9 of the switch 7. Then, the storage auto-scale processing apparatus 10 manages access frequency (the number of times of accesses) of each piece of data read from, or written to, the virtual volumes VVOL according to the received the I/O command, and deviation of data accesses (hereinafter referred to as "access localization") with respect to each host 3 indicating which host 3 has accessed which data and how many times.

Furthermore, the storage auto-scale processing apparatus 10 acquires each pieces of information such as current latency of the relevant storage apparatus 5, the load status of the ports 25, the processors 22, and the memory 27, and the load status of the actual volume VOL associated with the virtual volume VVOL from/to which the host 3 reads/writes data (hereinafter referred to as a "primary volume RVOL"), from the storage apparatus 5 via the switch 7 (hereinafter collectively referred to as "storage information").

Then, when the storage auto-scale processing apparatus 10 detects the occurrence of the scale-out of the hosts 3 in the public cloud 2 on the basis of auto-scale information and if the port 25, the processor 22, or the cache memory 23 has a high load, the storage auto-scale processing apparatus 10 issues an instruction to the controller 21 for the storage apparatus 5 to increase the number of the ports 25 or the processors 22 to be allocated to the hosts 3, which are increased by the scale-out, or to increase the capacity of the cache memory 23 to be allocated to such hosts 3. Consequently, the controller 21 for the storage apparatus 5 increases the number of the ports 25 or the processors 22 to be allocated to the hosts 3 or increases the capacity of the cache memory 23 to be allocated to the hosts 3 in accordance with this instruction.

Furthermore, when the storage auto-scale processing apparatus 10 detects the occurrence of the scale-out of the hosts 3 and if the primary volume RVOL has a high load, the storage auto-scale processing apparatus 10 issues an instruction to the controller 21 for the storage apparatus 5 to identify data with high access frequency from each host 3 (hereinafter referred to as "high-frequency access data") and data with high access frequency from a specific host 3 (hereinafter referred to as "specific host localization data"), respectively, and copy these pieces of identified data to specified secondary volumes SVOL1, SVOL2.

Specifically speaking, regarding the high-frequency access data, the storage auto-scale processing apparatus 10 issues the instruction to the controller 21 for the storage apparatus 5 to copy the data to a secondary volume that is set in a storage area provided by another RAID group RG different from the RAID group RG in which the primary volume RVOL is set (hereinafter referred to as a "high-frequency secondary volume(s)") SVOL1. Consequently, the controller 21 for the storage apparatus 5 copies the designated high-frequency access data to the high-frequency secondary volume SVOL1 in accordance with this instruction.

Furthermore, regarding the specific host localization data, the storage auto-scale processing apparatus 10 issues the instruction to the controller 21 for the storage apparatus 5 to copy the data to a host-based secondary volume SVOL2 corresponding to the host 3 which has accessed to the specific host localization data with high frequency from among secondary volumes (hereinafter referred to as the "host-based secondary volumes") SVOL2 which are set respectively corresponding to the respective hosts 3 in the storage areas provided by RAID groups RG different from the respective RAID groups RG in which the primary volume RVOL and the high-frequency secondary volume SVOL1 are set. Incidentally, the respective host-based secondary volumes SVOL2 are set in storage areas provided respectively by the respectively different RAID group RGs. Consequently, the controller 21 for the storage apparatus 5 copies the designated specific host localization data to the corresponding host-based secondary volume SVOL2 in accordance with this instruction.

In addition, the storage auto-scale processing apparatus 10 issues an instruction to the controller 21 for the storage apparatus 5 to switch the corresponding block of the virtual block, in which the relevant data (the high-frequency access data or the specific host localization data) is stored, in the virtual volume VVOL to an actual block which is the data copy destination in the high-frequency secondary volume SVOL1 or the host-based secondary volume SVOL2, so that the host 3 will be able to access the data even after copying it. Consequently, the controller 21 for the storage apparatus 5 switches the corresponding block of the relevant virtual block to the relevant actual block in accordance with this instruction.

On the other hand, when the storage auto-scale processing apparatus 10 detects the occurrence of the scale-in of the hosts 3 in the public cloud 2 on the basis of the auto-scale information and if the ports 25, the processors 22, or the cache memory 23 has a low load, the storage auto-scale processing apparatus 10 issues an instruction to the controller 21 for the storage apparatus 5 to decrease the number of the ports 25 or the processors 22 to be allocated to the hosts 3 or to decrease the capacity of the cache memory 23 allocated to the hosts 3. Consequently, the controller 21 for the storage apparatus 5 decreases the number of the ports 25 or the processors 22 to be allocated to the hosts 3 or decreases the capacity of the cache memory 23 allocated to the hosts 3 in accordance with this instruction.

Furthermore, when the storage auto-scale processing apparatus 10 detects the occurrence of the scale-in of the hosts 3 and if the primary volume RVOL has a low load, the storage auto-scale processing apparatus 10 issues an instruction to the controller 21 for the storage apparatus 5 to delete the high-frequency secondary volume SVOL1 and the host-based secondary volumes SVOL2 in order to delete the copied data (the high-frequency access data and the specific host localization data). Consequently, the controller 21 for the storage apparatus 5 deletes the high-frequency secondary volume SVOL1 and the host-based secondary volumes SVOL2 in accordance with this instruction.

Under this circumstance, the storage auto-scale processing apparatus 10 issues an instruction to the controller 21 for the storage apparatus 5 to switch the corresponding block of the virtual block in the virtual volume VVOL, in which the high-frequency access data and the specific host localization data are stored, to the actual block, in which the high-frequency access data or the specific host localization data is stored, in the primary volume RVOL, so that the high-frequency access data and the specific host localization data can be accessed even after the deletion of the high-frequency secondary volume SVOL1 and the host-based secondary volumes SVOL2. Consequently, the controller 21 for the storage apparatus 5 switches the corresponding block of the relevant virtual block to the relevant actual block in accordance with this instruction.

In this way, this hybrid cloud system 1 is designed to be capable of performing the scale-out and the scale-in of the ports 25, the processors 22, the cache memory 23, and the primary volume RVOL in the storage apparatus 5 in response to the scale-out and the scale-in of the hosts 3 in the public cloud 2.

(1-2) Logical Configuration of Hybrid Cloud System

Figure 3:
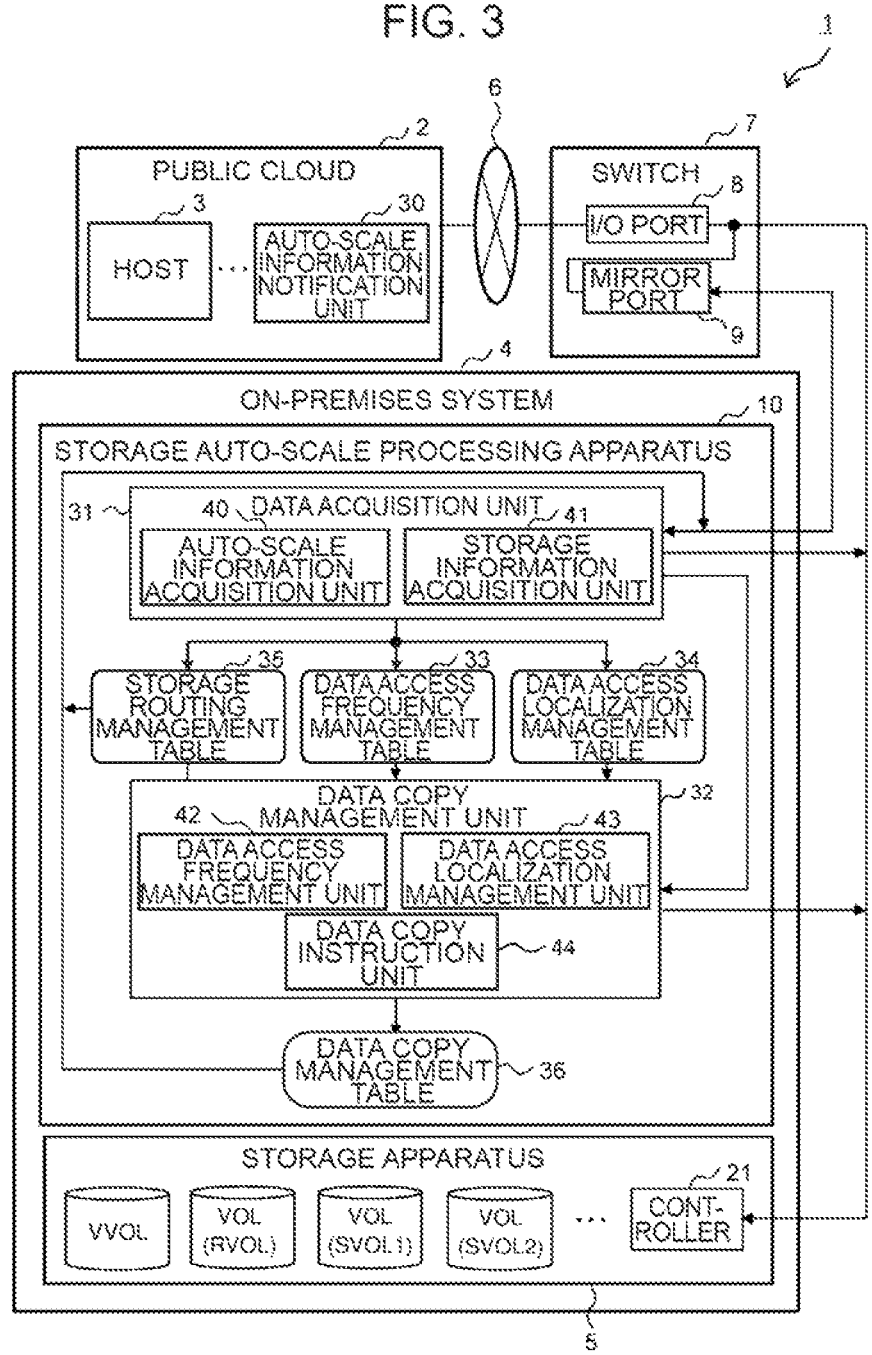
FIG. 3 is a block diagram illustrating a logical configuration of a storage auto-scale processing apparatus.

FIG. 3 illustrates a logical configuration of the above-described hybrid cloud system 1. With the hybrid cloud system 1 as illustrated in this FIG. 3, the public cloud 2 is provided with an auto-scale information notification unit 30 as a means for implementing the above-described auto-scale of the storage apparatus 5; and also, the storage auto-scale processing apparatus 10 is provided with a data acquisition unit 31 and a data copy management unit 32, a data access frequency management table 33, a data access localization management table 34, a storage routing management table 35, and a data copy management table 36.

When the scale-out or the scale-in of the hosts 3, which read/write data from/to the storage apparatus 5 at the on-premises 4, is performed in the public cloud 2 by means of the auto-scale function, the auto-scale information notification unit 30 is a functional unit having a function that informs the storage auto-scale processing apparatus 10 via the mirror port 9 of the switch 7 of the implementation of the scale-out or the scale-in and information such as identifiers of the respective hosts 3 (host ID's) after the scale-out or the scale-in as auto-scale information. The auto-scale information notification unit 30 is configured of a physical server apparatus or a virtual machine.

Furthermore, the data acquisition unit 31 for the storage auto-scale processing apparatus 10 is configured by including an auto-scale information acquisition unit 40 and a storage information acquisition unit 41. The auto-scale information acquisition unit 40 and the storage information acquisition unit 41 are functional units embodied by the CPU 26 (FIG. 1) by executing programs (which are not shown in the drawing) stored in the memory 27 (FIG. 1).

Of these units, the auto-scale information acquisition unit 40 has a function that manages the access frequency (the number of times of accesses) of each data stored in the primary volume RVOL of the storage apparatus 5 according to an I/O command, which is transmitted from the host 3 in the public cloud 2 to the storage apparatus 5, by using the data access frequency management table 33. Furthermore, the auto-scale information acquisition unit 40 manages information indicating which host 3 has accessed which data and how many times, by using the data access localization management table 34.

Furthermore, the auto-scale information acquisition unit 40 also has a function that acquires the auto-scale information transmitted from the auto-scale information notification unit 30 for the public cloud 2 and monitors whether the scale-out or the scale-in of the hosts 3 has occurred or not, on the basis of the acquired auto-scale information.

Then, when the auto-scale information acquisition unit 40 acquires the auto-scale information indicating the occurrence of the scale-out of the hosts 3, it judges whether or not the current latency of the storage apparatus 5 which has been reported by the storage information acquisition unit 41 as described later is smaller than a specified latency lower limit threshold value. Then, if the auto-scale information acquisition unit 40 determines that the latency of the storage apparatus 5 is smaller than the latency lower limit threshold value, it issues an instruction to the storage information acquisition unit 41 to identify a resource which has become a bottleneck (the resource which has a high load) from among the ports 25, the processors 22, the cache memory 23, and the primary volume RVOL of the storage apparatus 5.

Furthermore, when the auto-scale information acquisition unit 40 acquires the auto-scale information indicating the occurrence of the scale-in of the hosts 3, it judges whether or not the current latency of the storage apparatus 5 which has been reported from the storage information acquisition unit 41 exceeds a specified latency upper limit threshold value. Then, if the auto-scale information acquisition unit 40 determines that the latency of the storage apparatus 5 exceeds the latency upper limit threshold value, it issues an instruction to the storage information acquisition unit 41 to identify a resource which has become surplus (the resource which has a low load) from among the ports 25, the processors 22, the cache memory 23, and the primary volume RVOL of the storage apparatus 5.

The storage information acquisition unit 41 has a function that always collect the latency of the storage apparatus 5 and the information relating to the load status of the ports 25, the processors 22, the cache memory 23, and the primary volume RVOL of the storage apparatus 5 as the storage information from the storage apparatus 5 via the switch 7. Incidentally, examples of the "information relating to the load status" of the ports 25, the processors 22, the cache memory 23, and the primary volume RVOL can include a usage band regarding the port 25, a utilization rate regarding the processor 22, usage capacity regarding the cache memory 23, and IOPS (Input Output Per Second) regarding the primary volume RVOL. Then, the storage information acquisition unit 41 notifies the auto-scale information acquisition unit 40 of the latency of the storage apparatus 5 among the collected storage information.

Furthermore, the storage information acquisition unit 41 issues an instruction to the controller 21 for the storage apparatus 5 and the data copy management unit 32 to: identify the resource which has the high load or which has become surplus, from among the ports 25, the processors 22, the cache memory 23, and the primary volume RVOL in the storage apparatus 5 in accordance with the instruction given from the auto-scale information acquisition unit 40 as described above; and resolve the high load or the surplus of the identified resource.

For example, if the port 25, the processor 22, or the cache memory 23 has the high load, the storage information acquisition unit 41 issues an instruction to the controller 21 for the storage apparatus 5 to increase the number of the ports 25 or the processors 22 allocated to the hosts 3 or the capacity of the cache memory 23.

Furthermore, if the primary volume RVOL has the high load, the storage information acquisition unit 41 issues a copy instruction to the data copy management unit 32 to copy the high-frequency access data to the high-frequency secondary volume SVOL1 and copy the specific host localization data to the host-based secondary volume SVOL2.

On the other hand, if the ports 25, the processors 22, or the cache memory 23 in the storage apparatus 5 has become surplus, the storage information acquisition unit 41 issues an instruction to the controller 21 for the storage apparatus 5 to decrease the number of the ports 25 or the processors 22 allocated to the hosts 3 or the capacity of the cache memory 23. Furthermore, if the primary volume RVOL has a low load, the storage information acquisition unit 41 issues a deletion instruction to the data copy management unit 32 to delete the high-frequency secondary volume SVOL1 and each host-based secondary volume SVOL2.

The data copy management unit 32 is configured by including a data access frequency management unit 42, a data access localization management unit 43, and a data copy instruction unit 44. The data access frequency management unit 42, the data access localization management unit 43, and the data copy instruction unit 44 are also functional units embodied by the CPU 26 (FIG. 1) by executing the programs stored in the memory 27 (FIG. 1).

When the aforementioned copy instruction is given from the storage information acquisition unit 41, the data access frequency management unit 42 has a function that identifies the high-frequency access data among the data stored in the storage apparatus 5 by referring to the data access frequency management table 33. The data access frequency management unit 42 informs the data copy instruction unit 44 of each identified high-frequency access data.

Furthermore, when the aforementioned copy instruction is given from the storage information acquisition unit 41, the data access localization management unit 43 has a function that identifies the specific host localization data for each host 3 by referring to the data access localization management table 34. The data access localization management unit 43 informs the data copy instruction unit 44 of the specific host localization data for each identified host 3.

When the aforementioned copy instruction is given from the storage information acquisition unit 41, the data copy instruction unit 44 has a function that controls the storage apparatus 5 to copy the high-frequency access data to the high-frequency secondary volume and copy the specific host localization data to the host-based secondary volume.

Practically, when the aforementioned copy instruction is given from the storage information acquisition unit 41, the data copy instruction unit 44 issues an instruction to the controller 21 for the storage apparatus 5 to copy each high-frequency access data identified by the data access frequency management unit 42 to the high-frequency secondary volume SVOL1. Under this circumstance, if the high-frequency secondary volume SVOL1 does not exist in the storage apparatus 5, the data copy instruction unit 44 issues an instruction to the controller 21 for the storage apparatus 5 in advance to create the high-frequency secondary volume SVOL1.

Furthermore, in conjunction with the above, the data copy instruction unit 44: issues an instruction to the controller 21 for the storage apparatus 5 to switch the corresponding block of the virtual block, in which the high-frequency access data is stored in the virtual volume VVOL, from a copy-source actual block in which the high-frequency access data is stored in the primary volume RVOL to a copy-destination actual block of the relevant high-frequency access data in the high-frequency secondary volume SVOL1; and accordingly updates the storage routing management table 35 described later.

In conjunction with the above, when the aforementioned copy instruction is given from the storage information acquisition unit 41, the data copy instruction unit 44 issues an instruction to the controller 21 for the storage apparatus 5 to copy each specific host localization data identified by the storage information acquisition unit 41 to its corresponding host-based secondary volume SVOL2. Under this circumstance, if the corresponding host-based secondary volume SVOL2 does not exist in the storage apparatus 5, the data copy instruction unit 44 issues an instruction to the controller 21 for the storage apparatus 5 in advance to create the host-based secondary volume SVOL2.

Furthermore, in conjunction with the above, the data copy instruction unit 44: issues an instruction to the controller 21 for the storage apparatus 5 to switch the corresponding block of the virtual block, in which the specific host localization data is stored in the virtual volume VVOL, from a copy-source actual block in which the specific host localization data is stored in the primary volume RVOL to a copy-destination actual block of the relevant the specific host localization data in the host-based secondary volume SVOL2; and accordingly updates the storage routing management table 35 described later.

Then, the data copy instruction unit 44 manages the high-frequency access data and the specific host localization data, which are copied from the primary volume RVOL to the high-frequency secondary volume SVOL1 and the host-based secondary volume SVOL2 as described above, by using the data copy management table 36.

On the other hand, when the aforementioned deletion instruction is given from the storage acquisition unit 41, the data copy instruction unit 44 issues an instruction to the controller 21 for the storage apparatus 5 to delete the high-frequency secondary volume SVOL1 and all the host-based secondary volumes SVOL2. Furthermore, the data copy instruction unit 44: issues an instruction, regarding the data copied to the high-frequency secondary volume SVOL1 and the host-based secondary volumes SVOL2 among each piece of data stored in the virtual volume VVOL, to the controller 21 for the storage apparatus 5 to switch the corresponding block of the virtual block, in which that data is stored, to the actual block in the primary volume RVOL in which that data is stored; and accordingly updates the storage routing management table 35.

The data access frequency management table 33: is a table used by the auto-scale information acquisition unit 40 to manage the access frequency (the number of times of accesses) from the hosts 3 to each data stored in the primary volume RVOL; and is configured by including a data ID column 33A and the number-of-times-of-accesses column 33B as illustrated in FIG. 4. Regarding the data access frequency management table 33, one row corresponds to one piece of data stored in one primary volume RVOL.

Then, the data ID column 33A stores an identifier of each data (data ID) stored in the primary volume RVOL. Furthermore, the number-of-times-of-accesses column 33B stores the accumulated number of times (the number of times of accesses) any one of the hosts 3 has accessed the data up to now. Therefore, an example in FIG. 4 shows that, for example, the number of times of accesses to the data to which the data ID "#1" is assigned up to now is "once" and the number of times of accesses to the data to which the data ID "#2" is assigned up to now is "10000" times.

Furthermore, the data access localization management table 34: is a table used by the data access localization management unit 43 to manage the number of times of accesses by each host 3 to each data; and is configured by including a host ID column 34A, a data ID column 34B, and the number-of-times column 34C as illustrated in FIG. 5. Regarding the data access localization management table 34, one row corresponds to a combination of one host 3 and one piece of data accessed by that host 3.

Then, the host ID column 34A stores a host ID of a host 3 which has accessed any one piece of the data. Furthermore, the data ID column 34B stores a data ID of the data accessed by that host 3; and the number-of-times column 34C stores the number of times of accesses which have been made by that host 3 to that data up to now.

Therefore, an example in FIG. 5 shows that the host 3 to which the host ID "#1" is assigned has accessed data with the data ID "#1" "100" times and has accessed data with the data ID "#2" "10" times up to now.

The storage routing management table 35 is a table used by the storage auto-scale processing apparatus 10 (FIG. 3) to manage routes from each host 3 in the public cloud 2 to the actual volumes VOL (the primary volume RVOL, the high-frequency secondary volume SVOL1, or the host-based secondary volume SVOL2) in which data written by that host 3 to the virtual volume VVOL is stored.

The storage routing management table 35 is configured, as illustrated in FIG. 6A, by including a serial number column 35A, a host ID column 35B, an initiator name column 35C, a target name column 35D, a processor ID column 35E, a cache ID column 35F, and a volume ID column 35G. Regarding the storage routing management table 35, one row corresponds to one route from one port of one host 3 to the actual volume VOL (the primary volume RVOL, the high-frequency secondary volume SVOL1, or the host-based secondary volume SVOL2) in the storage apparatus 5 connected to that port.

Then, the serial number column 35A stores a serial number which starts with "1" for management in the storage routing management table 35; and the host ID column 35B stores a host ID of a host 3 which uses the relevant route. Furthermore, the initiator name column 35C stores an iSCSI (internet Small Computer System Interface) name assigned to an initiator of that host 3; and the target name column 35D stores an iSCSI target name assigned to the port 25 on the storage apparatus 5 side connected with that host 3 through the relevant route.

Furthermore, the processor ID column 35E stores a unique identifier of the processor 22 (processor ID) which is assigned to the processor 22 in the storage apparatus 5 to which data input/output processing using the relevant route is allocated; and the cache ID column 35F stores a unique identifier (cache ID) of the cache memory 23 (FIG. 1) which is allocated to the relevant processor 22. Furthermore, the volume ID column 35G stores the volume ID of the actual volume VOL which is a terminal end of the relevant route.

Incidentally, FIG. 6A is an example of a case where a communication protocol between the hosts 3 and the storage apparatus 5 via the network 6 is iSCSI, and if the communication protocol is Fibre Channel (FC), the configuration of the storage routing management table 35 is as illustrated in FIG. 6B where the suffix "X" is added to the corresponding parts of FIG. 6A.

This storage routing management table 35 is configured by including a serial number column 35AX, a host ID column 35BX, a host-side WWN column 35CX, a storage-side WWN column 35DX, a processor ID column 35EX, a cache ID column 35FX, and a volume ID column 35GX. Then, information similar to that stored in the serial number column 35A, the host ID column 35B, the processor ID column 35E, the cache ID column 35F, and the volume ID column 35G of the storage routing management table 35, which are described above with respect to FIG. 6A, is stored respectively in the serial number column 35AX, the host ID column 35BX, the processor ID column 35EX, the cache ID column 35FX, and the volume ID column 35GX.

Furthermore, the host-side WWN column 35CX stores a WWN (World-Wide Name) assigned to the corresponding HAB (Host Bus Adapter) for the host 3; and the storage-side WWN column 35DX stores a WWN assigned to the corresponding port 25 (FIG. 1) of the storage apparatus 5.

The data copy management table 36: is a table used by the data copy instruction unit 44 (FIG. 3) to manage which data of each piece of data stored in the primary volume RVOL is copied to the high-frequency secondary volume SVOL1 or the host-based secondary volume SVOL2; and is configured, as illustrated in FIG. 7, by including a data ID column 36A and a copied execution flag column 36B. Regarding the data copy management table 36, one row corresponds to one piece of data stored in the primary volume RVOL.

Then, the data ID column 36A stores a data ID of each data stored in the primary volume RVOL; and the copied execution flag column 36B stores a flag indicating whether the relevant data is copied to the high-frequency secondary volume SVOL1 or the host-based secondary volume SVOL2 (hereinafter referred to as a "copied flag"). In an example in FIG. 7, the value of the copied flag is set as: "1" when the relevant data is copied to the high-frequency secondary volume SVOL1 or the host-based secondary volume SVOL2; and "0" when the relevant data is not copied to the high-frequency secondary volume SVOL1 or the host-based secondary volume SVOL2.

Therefore, in the case of the example in FIG. 7, it is shown that for example, the data to which the data ID's such as "#1" to "#3" and the data ID "#5" are assigned, respectively, are copied to the high-frequency secondary volume SVOL1 or the host-based secondary volume SVOL2; however, the data to which the data ID's "#4" and "#6" are assigned are not copied to the high-frequency secondary volume SVOL1 or the host-based secondary volume SVOL2.

(2) Flows of Various Kinds of Processing

Next, the processing content of various kinds of processing executed by the storage auto-scale processing apparatus 10 will be explained. Incidentally, a processing subject of the various kinds of processing will be hereinafter explained as a "functional unit (XXX unit)"; however, practically, it is needless to say that the CPU 26 (FIG. 1) executes the processing according to a program corresponding to that "functional unit."

(2-1) Access Information Collection Processing

Figure 8:
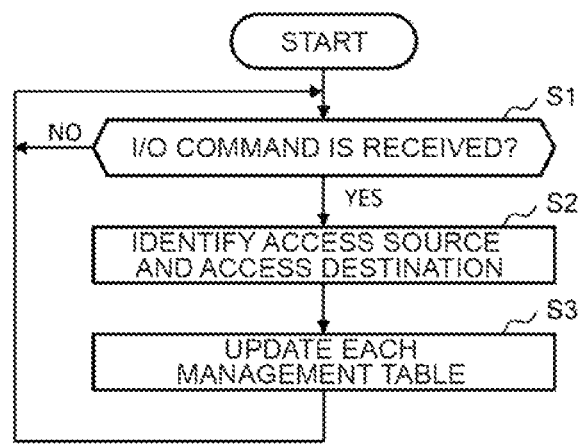
FIG. 8 is a flowchart illustrating a processing sequence for access information collection processing.

FIG. 8 illustrates a processing sequence for access information collection processing which is always executed by the auto-scale information acquisition unit 40 (FIG. 3) for the data acquisition unit 31 (FIG. 3). The auto-scale information acquisition unit 40 collects access information indicating the status of accesses from the hosts 3 in the public cloud 2 to data in the storage apparatus 5 in accordance with the processing sequence illustrated in this FIG. 3.

Practically, after starting this access information collection processing, the auto-scale information acquisition unit 40 firstly waits for an I/O command to be transmitted from the corresponding host 3 in the public cloud 2 (S1).

Then, after receiving the I/O command from that host 3, the auto-scale information acquisition unit 40 identifies the host 3, which is an access source of that I/O command, and access target data, respectively (S2). Furthermore, the auto-scale information acquisition unit 40 updates the data access frequency management table 33 and the data access localization management table 34 on the basis of this identified result (S3).

Specifically speaking, the auto-scale information acquisition unit 40 increments a numerical value (increases it by one) stored in the number-of-times-of-accesses column 33B (FIG. 4) of an entry corresponding to the access target data in the data access frequency management table 33. Furthermore, the auto-scale information acquisition unit 40 increments a numerical value stored in the number-of-times column 34C (FIG. 5) for an entry regarding which the host ID of the host 3, which is the access source, is stored in the host ID column 34A (FIG. 5) and the data ID of the access target data is stored in the data ID column 34B (FIG. 5) of the data access localization management table 34.

Subsequently, the auto-scale information acquisition unit 40 repeats the processing of step S1 to step S3.

(2-2) Storage Scale-Out Processing

Figure 9:
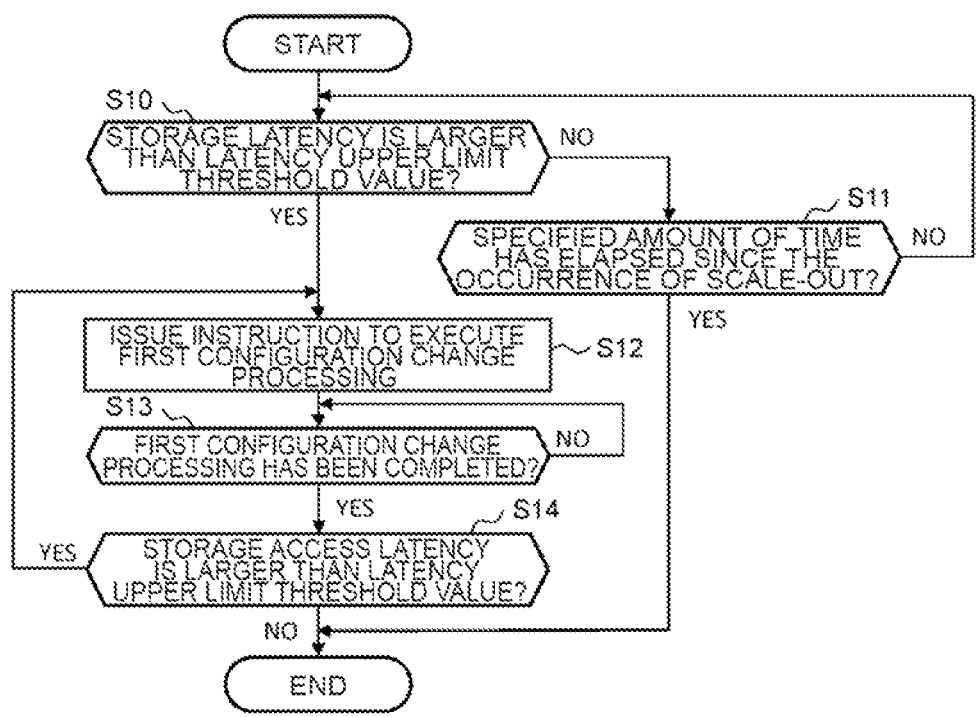
FIG. 9 is a flowchart illustrating a processing sequence for storage scale-out processing.

FIG. 9 illustrates a flow of storage scale-out processing executed by the auto-scale information acquisition unit 40 for the storage auto-scale processing apparatus 10 to which the auto-scale information indicating the occurrence of the scale-out is given from the auto-scale information notification unit 30 for the public cloud 2.

After receiving the auto-scale information, the auto-scale information acquisition unit 40 firstly judges whether the latest latency of the storage apparatus 5, which has been given from the storage information acquisition unit 41, exceeds a preset first threshold value (hereinafter referred to as a "latency upper limit threshold value") or not (S10).

If the auto-scale information acquisition unit 40 obtains a negative result in this judgment, it judges whether or not a specified amount of time has elapsed since the execution of the auto-scale in the public cloud 2 (S11).

Then, if the auto-scale information acquisition unit 40 obtains a negative result in this judgment, it returns to step S10 and subsequently repeats a loop of step S10 and step S11 and then step S10 until it obtains an affirmative result in step S10 or step S11.

Incidentally, to wait for the elapse of the certain amount of time after the occurrence of the auto-scale is because there is a time lag after the occurrence of the scale-out in the public cloud 2 until the occurrence of a load change in the storage apparatus 5, so that it is intended to accurately detect the load status, which is attributable to the scale-out, on the storage apparatus 5 side.

Then, if the latency of the storage apparatus 5 does not exceed the latency upper limit threshold value even after the elapse of the certain amount of time after the occurrence of the scale-out and the auto-scale information acquisition unit 40 obtains the affirmative result in step S11, it terminates this storage scale-out processing.

On the other hand, if the auto-scale information acquisition unit 40 obtains the affirmative result in the judgment of step S10, it issues an instruction to the storage information acquisition unit 41 (FIG. 3) to execute first configuration change processing described later with reference to FIG. 10 (this instruction will be hereinafter referred to as a "first configuration change processing execution instruction") (S12). Consequently, after receiving this first configuration change processing execution instruction, the storage information acquisition unit 41 identifies a resource which has become a bottleneck (or which has a high load) among the ports 25 (FIG. 1), the processors 22 (FIG. 1), the cache memory 23 (FIG. 1), and the primary volume RVOL (FIG. 1) of the storage apparatus 5 as described later and changes the configuration of that resource.

Next, the auto-scale information acquisition unit 40 waits for the first configuration change processing by the storage information acquisition unit 41 to be terminated (S13); and if this first configuration change processing is eventually completed, the auto-scale information acquisition unit 40 judges again whether the latency of the storage apparatus 5 exceeds the latency upper limit threshold value or not (S14).

Then, if the auto-scale information acquisition unit 40 obtains an affirmative result in this judgment, it returns to step S12 and subsequently repeats the processing of step S12 to step S14 until it obtains a negative result in step S14. As a result of this repetitive processing, the configurations of all the resources which have become bottlenecks among the ports 25, the processors 22, the cache memory 23, and the primary volume RVOL of the storage apparatus 5 are changed, respectively.

Furthermore, if the auto-scale information acquisition unit 40 obtains the negative result in step S14 as the configuration changes of all the resources which are the bottlenecks are completed and the latency of the storage apparatus 5 becomes equal to or smaller than the latency upper limit threshold value, it terminates this storage scale-out processing.

(2-3) First Configuration Change Processing

Figure 10:
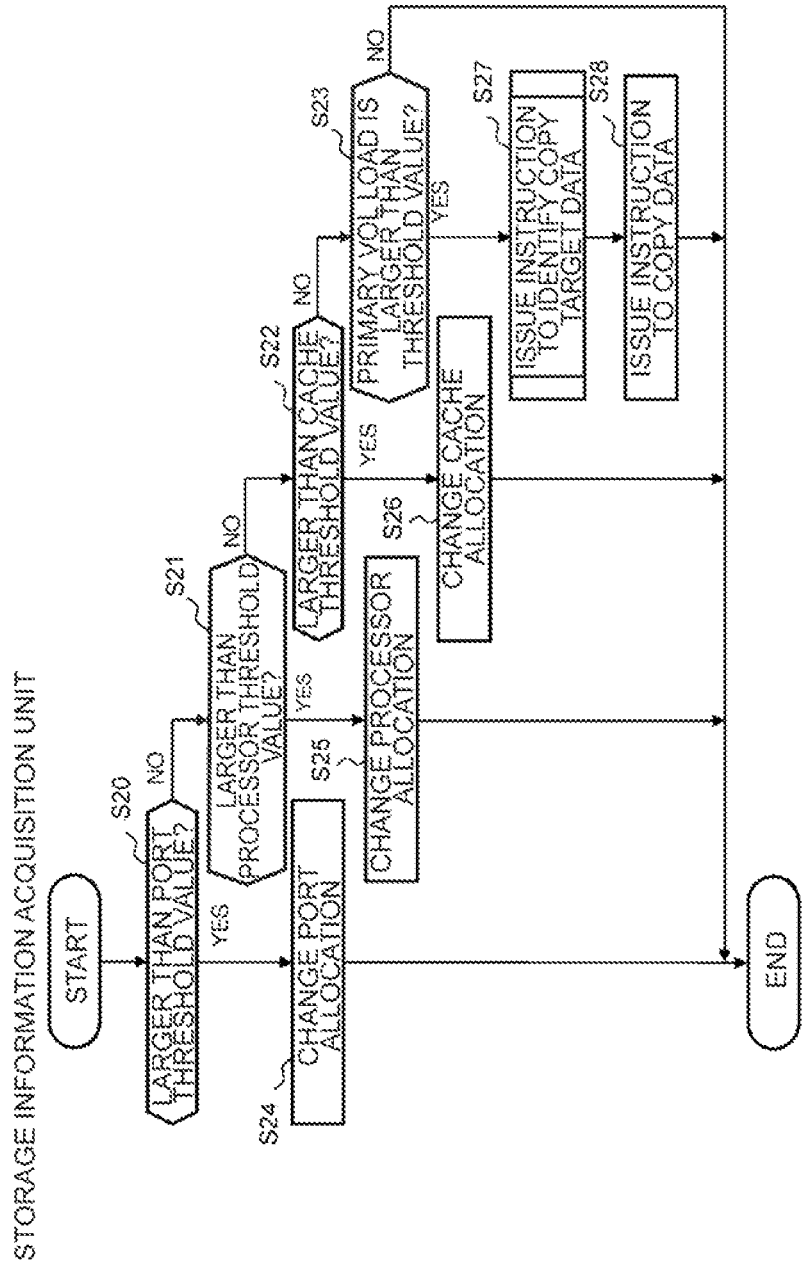
FIG. 10 is a flowchart illustrating a processing sequence for first configuration change processing.

FIG. 10 illustrates processing content of the first configuration change processing executed by the storage information acquisition unit 41 to which the aforementioned first configuration change processing execution instruction is given from the auto-scale information acquisition unit 40 in step S12 of the storage scale-out processing described above with reference to FIG. 9. The storage information acquisition unit 41 identifies a resource which has become a bottleneck (or which has a high load) among the ports 25, the processors 22, the cache memory 23, and the primary volume RVOL of the storage apparatus 5 in accordance with the processing sequence illustrated in this FIG. 10 and changes the configuration of that resource.

Practically, after receiving the first configuration change processing execution instruction from the auto-scale information acquisition unit 40, the storage information acquisition unit 41 starts the first configuration change processing illustrated in this FIG. 10 and firstly judges whether the usage band of each port 25 currently allocated to the hosts 3 exceeds a specified upper limit threshold value or not, on the basis of the latest storage information (S20). Then, if the storage information acquisition unit 41 obtains an affirmative result in this judgment, it issues an instruction to the controller 21 for the storage apparatus 5 to increase the number of the ports 25 to be allocated to the hosts 3 (S24), and then terminates this first configuration change processing.

On the other hand, if the storage information acquisition unit 41 obtains a negative result in the judgment of step S20, it judges whether the utilization rate of the processors 22 allocated to the hosts 3 exceeds a specified upper limit threshold value or not, on the basis of the latest storage information (S21). Then, if the storage information acquisition unit 41 obtains an affirmative result in this judgment, it issues an instruction to the controller 21 for the storage apparatus 5 to increase the number of the processors 22 to be allocated to the hosts 3 (S25), and then terminates this first configuration change processing.

Furthermore, if the storage information acquisition unit 41 obtains a negative result in the judgment of step S21, it judges whether the usage capacity of the cache memory 23 allocated to the hosts 3 exceeds a predefined specified upper limit threshold value or not (S22). Then, if the storage information acquisition unit 41 obtains an affirmative result in this judgment, it issues an instruction to the controller 21 for the storage apparatus 5 to increase the capacity of the cache memory 23 to be allocated to the hosts 3 (S26), and then terminates this first configuration change processing.

On the other hand, if the storage information acquisition unit 41 obtains a negative result in the judgment of step S22, it judges whether the IOPS (Input Output Per Second) of the primary volume RVOL exceeds a predefined specified upper limit threshold value or not (S23). Then, if the storage information acquisition unit 41 obtains a negative result in this judgment, it terminates this first configuration change processing.

Furthermore, if the storage information acquisition unit 41 obtains an affirmative result in the judgment of step S23, it issues an instruction to the data copy management unit 32 to identify data to be copied to the high-frequency secondary volume SVOL1 or the host-based secondary volume SVOL2 and copy the identified data to the high-frequency secondary volume SVOL1 or the corresponding host-based secondary volume SVOL2 (S27, S28). Then, the storage information acquisition unit 41 terminates this first configuration change processing.

Figure 11:
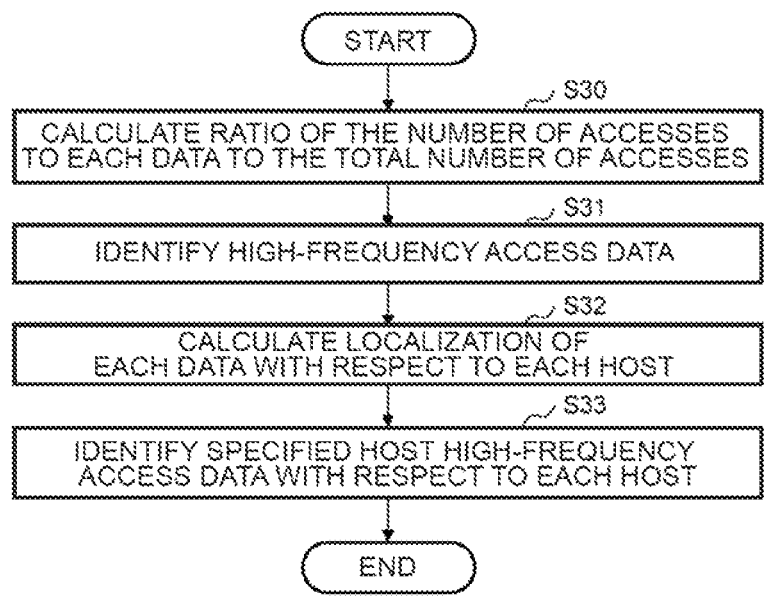
FIG. 11 is a flowchart illustrating a processing sequence for copy target data identification processing.

Now, FIG. 11 illustrates a processing sequence for the copy target data identification processing executed by the data copy management unit 32 to which the instruction to identify the data to be copied to the high-frequency secondary volume SVOL1 or the host-based secondary volume SVOL2 (hereinafter referred to as a "copy target data identification instruction") is given from the storage information acquisition unit 41 in step S27 (FIG. 10) of the first configuration change processing.

After the data copy management unit 32 receives the copy target data identification instruction from the storage information acquisition unit 41, the data access frequency management unit 42 firstly refers to the data access frequency management table 33 (FIG. 4) and calculates a ratio R1 of the number of times of accesses to the relevant data to the total number of accesses to the respective pieces of data stored in the primary volume RVOL as indicated in the following expression with respect to each piece of the data stored in the primary volume RVOL (S30).

[Math. 1]
$$R1 = \frac{\text{The Number of Times of Accesses to The Relevant Data}}{\text{The Total Number of Times of Accesses to The Entire Data}} \quad (1)$$

Then, the data access frequency management unit 42 identifies the respective pieces of data regarding which the ratio R1 calculated in step S30 exceeds a predefined threshold value, as the high-frequency access data and acquires the data ID's of these pieces of data (S31).

Subsequently, the data access localization management unit 43 refers to the data access localization management table 34 (FIG. 5) and calculates a ratio R2 of the total number of times of accesses from the host 3 to the total number of times of accesses to the relevant data as indicated in the following expression with respect to each piece of data stored the primary volume RVOL (S32).

[Math. 2]
$$R2 = \frac{\text{The Total Number of Times of Accesses from Specific Host}}{\text{The Total Number of Times of Accesses to The Relevant Data}} \quad (2)$$

Then, the data access localization management unit 43 identifies each pieces of data regarding which the ratio R2 of any one of the hosts 3 exceeds a predefined threshold value, from among the ratios R2 calculated in step S32, as the specific host localization data and acquires the data ID's of these pieces of data (S33). As a result, this copied data identification processing terminates.

Figure 12:
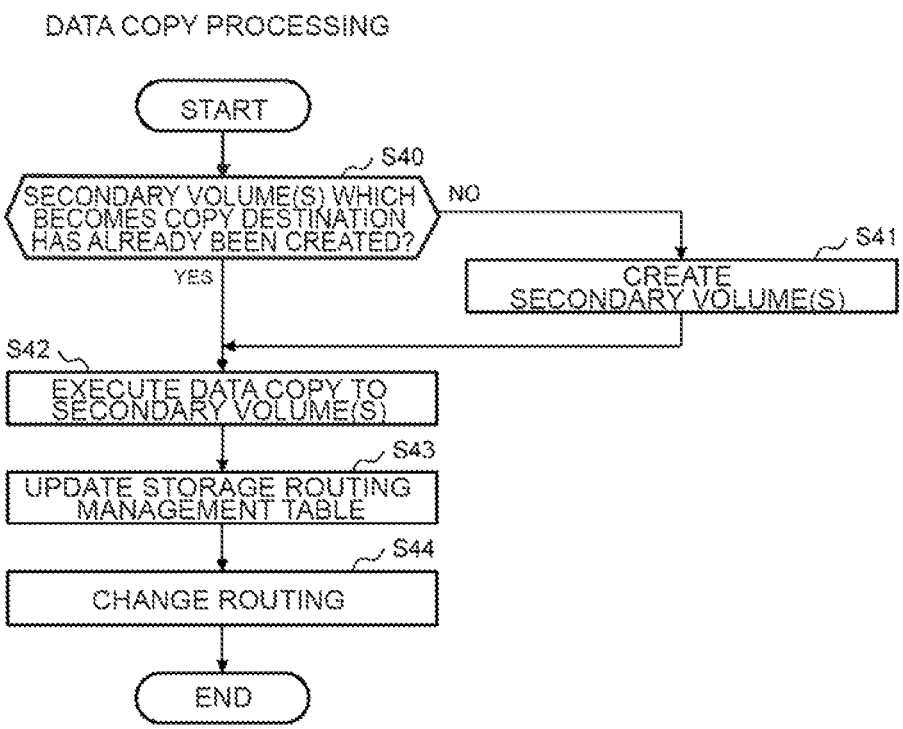
FIG. 12 is a flowchart illustrating a processing sequence for data copy processing.

Furthermore, FIG. 12 illustrates specific processing content of the data copy processing executed by the data copy instruction unit 44 for the data copy management unit 32 to which the instruction to copy the high-frequency access data or the specific host localization data to the high-frequency secondary volume SVOL1 or the corresponding host-based secondary volume SVOL2 (the copy instruction) is given from the storage information acquisition unit 41 in step S28 (FIG. 10) of the first configuration change processing.

After receiving the copy instruction, the data copy instruction unit 44 starts the data copy processing illustrated in this FIG. 12 and firstly refers to the data copy management table 36 (FIG. 7) and judges whether or not all the secondary volumes (the high-frequency secondary volume SVOL1 and the host-based secondary volumes SVOL2) for storing each high-frequency access data and each specific host localization data which are identified by the copy target data identification processing described above with reference to FIG. 11 have been created (S40).

For example, if the copied execution flag of at least one entry is set to "1" among the respective entries of the data copy management table 36 corresponding to the respective pieces of data identified as the high-frequency access data by the copy target data identification processing, the data copy instruction unit 44 determines that the high-frequency secondary volume SVOL1 has been created. Therefore, in this case, the data copy instruction unit 44 obtains an affirmative result in step S40.

On the other hand, if the copied execution flag of all the entries corresponding to the respective pieces of data identified as the high-frequency access data by the copy target data identification processing is set to "0" among the entries of the data copy management table 36, the data copy instruction unit 44 determines that the high-frequency secondary volume SVOL1 has not been created. Therefore, in this case, the data copy instruction unit 44 obtains a negative result in step S40.

Furthermore, if the copied execution flag of at least one entry is set to "1" among the respective entries of the data copy management table 36 corresponding to the respective pieces of data identified as the specific host localization data of a certain host 3 by the copy target data identification processing, the data copy instruction unit 44 determines that the host-based secondary volume SVOL2 corresponding to that host 3 has been created. Therefore, in this case, the data copy instruction unit 44 obtains the affirmative result in step S40.

On the other hand, if the copied execution flag of all the entries corresponding to the respective pieces of data identified as the specific host localization data of the hosts 3 by the copy target data identification processing is set to "0" among the entries of the data copy management table 36, the data copy instruction unit 44 determines that the host-based secondary volume SVOL2 corresponding to that host 3 has not been created. Therefore, in this case, the data copy instruction unit 44 obtains the negative result in step S40.

Then, if the data copy instruction unit 44 obtains the affirmative result in the judgment of step S40, it proceeds to step S42. Furthermore, if the data copy instruction unit 44 obtains the negative result in the judgment of step S40, it issues an instruction to the controller 21 for the storage apparatus 5 to create all the secondary volumes (the high-frequency secondary volume SVOL1 and/or the host-based secondary volume SVOL2) which are determined in step S40 that they have not been created (S41).

Subsequently, the data copy instruction unit 44 issues an instruction to the controller 21 for the storage apparatus 5 to copy each high-frequency access data and each specific host localization data, which are identified by the copy target data identification processing, to their corresponding high-frequency secondary volume SVOL1 or host-based secondary volume SVOL2 (S42).

Next, the data copy instruction unit 44 updates the volume ID stored in the volume ID column 35B, 35BX of the entries respectively corresponding to each high-frequency access data and each specific host localization data regarding which the instruction has been issued to the controller 21 for the storage apparatus 5 to copy the data to in step S42, among the entries of the storage routing management table 35 (FIG. 6A or FIG. 6B), to the volume ID of the high-frequency secondary volume SVOL1 or the host-based secondary volume SVOL2 which is the copy destination of the high-frequency access data or the specific host localization data (S43).

Furthermore, the data copy instruction unit 44 refers to the storage routing management table 35 and causes the controller 21 for the storage apparatus 5 to switch the route to a necessary host 3 and execute routing change processing such as a change of the ports 25 in a case of an increase of the ports 25 (S44), and then terminates this data copy processing.

(2-4) Storage Scale-In Processing

Figure 13:
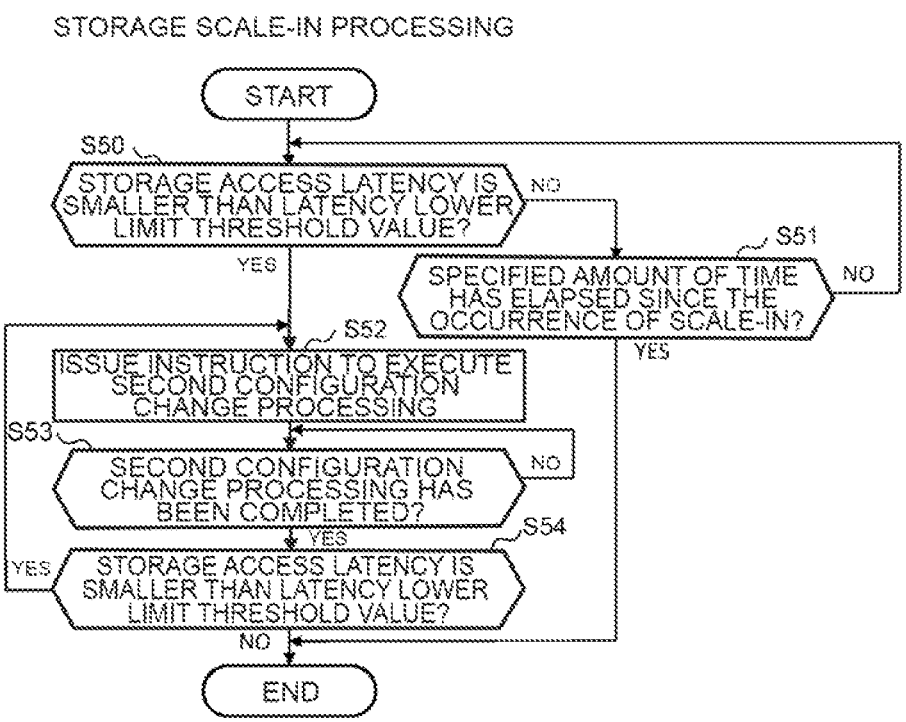
FIG. 13 is a flowchart illustrating a processing sequence for storage scale-in processing.

Meanwhile, FIG. 13 illustrates a flow of storage scale-in processing executed by the auto-scale information acquisition unit 40 for the storage auto-scale processing apparatus 10 to which the auto-scale information indicating the occurrence of the scale-in is given from the auto-scale information notification unit 30 for the public cloud 2.

After receiving such auto-scale information, the auto-scale information acquisition unit 40 firstly judges whether or not the latest latency of the storage apparatus 5 which has been given from the storage information acquisition unit 41 is smaller than a preset second threshold value (hereinafter referred to as a "latency lower limit threshold value") (S50).

If the auto-scale information acquisition unit 40 obtains a negative result in this judgment, it judges whether or not a specified amount of time has elapsed since the execution of the auto-scale in the public cloud 2 (S51). Then, if the auto-scale information acquisition unit 40 obtains a negative result in this judgment, it returns to step S50 and subsequently repeats a loop of step S50 and step S51 and then step S50 until it obtains an affirmative result in step S50 or step S51.

Incidentally, to wait for the elapse of the certain amount of time after the occurrence of the auto-scale is because there is a time lag after the occurrence of the scale-in in the public cloud 2 until the occurrence of a load change in the storage apparatus 5, so that it is intended to accurately detect the load status, which is attributable to the scale-in, on the storage apparatus 5 side.

Then, if the latency of the storage apparatus 5 is not smaller than the latency lower limit threshold value even after the elapse of the certain amount of time after the occurrence of the scale-in and the auto-scale information acquisition unit 40 obtains the affirmative result in step S51, it terminates this storage scale-in processing.

On the other hand, if the auto-scale information acquisition unit 40 obtains the affirmative result in the judgment of step S50, it issues an instruction to the storage information acquisition unit 41 (FIG. 3) to execute second configuration change processing described later with reference to FIG. 14 (this instruction will be hereinafter referred to as a "second configuration change processing execution instruction") (S52). Consequently, after receiving this second configuration change processing execution instruction, the storage information acquisition unit 41 identifies a resource which has become surplus (or which has a low load) among the ports 25, the processors 22, the cache memory 23, and the primary volume RVOL of the storage apparatus 5 as described later and changes the configuration of that resource.

Next, the auto-scale information acquisition unit 40 waits for the second configuration change processing by the storage information acquisition unit 41 to be terminated (S53); and if this second configuration change processing is eventually completed, the auto-scale information acquisition unit 40 judges again whether the latency of the storage apparatus 5 is smaller than the latency lower limit threshold value or not (S54).

Then, if the auto-scale information acquisition unit 40 obtains an affirmative result in this judgment, it returns to step S52 and subsequently repeats the processing of step S52 to step S54 until it obtains a negative result in step S54. As a result of this repetitive processing, the configurations of all the resources which have become surplus among the ports 25, the processors 22, the cache memory 23, and the primary volume RVOL of the storage apparatus 5 are changed, respectively.

Furthermore, if the auto-scale information acquisition unit 40 obtains the negative result in step S54 as the configuration changes of all the resources which are surplus are completed and the latency of the storage apparatus 5 becomes equal to or larger than the latency lower limit threshold value, it terminates this storage scale-in processing.

(2-5) Second Configuration Change Processing

Figure 14:
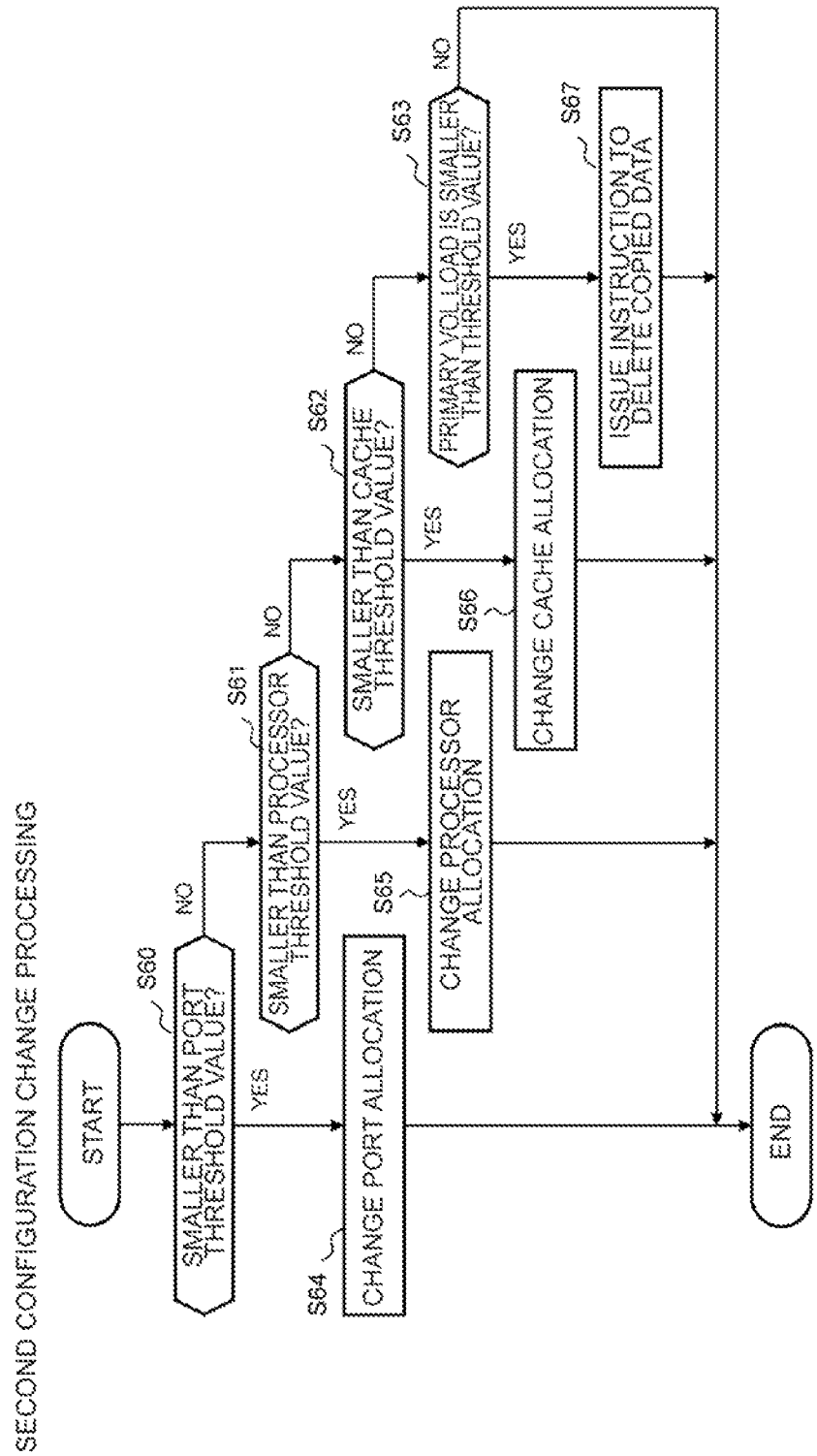
FIG. 14 is a flowchart illustrating a processing sequence for second configuration change processing.

FIG. 14 illustrates processing content of the second configuration change processing executed by the storage information acquisition unit 41 to which the aforementioned second configuration change processing execution instruction is given from the auto-scale information acquisition unit 40 in step S53 of the storage scale-in processing described above with reference to FIG. 13. The storage information acquisition unit 41 identifies a resource which has become surplus (or which has a low load) among the ports 25, the processors 22, the cache memory 23, and the primary volume RVOL of the storage apparatus 5 in accordance with the processing sequence illustrated in this FIG. 14 and changes the configuration of that resource.

Practically, after receiving the second configuration change processing execution instruction from the auto-scale information acquisition unit 40, the storage information acquisition unit 41 starts the second configuration change processing illustrated in this FIG. 14 and firstly judges whether the usage band of each port 25 currently allocated to the hosts 3 is smaller than a predefined specified lower limit threshold value or not, on the basis of the latest storage information (S60). Then, if the storage information acquisition unit 41 obtains an affirmative result in this judgment, it issues an instruction to the controller 21 for the storage apparatus 5 to decrease the number of the ports 25 to be allocated to the hosts 3 (S64), and then terminates this second configuration change processing.

On the other hand, if the storage information acquisition unit 41 obtains a negative result in the judgment of step S60, it judges whether the utilization rate of the processors 22 allocated to the hosts 3 is smaller than a predefined specified lower limit threshold value or not, on the basis of the latest storage information (S61). Then, if the storage information acquisition unit 41 obtains an affirmative result in this judgment, it issues an instruction to the controller 21 for the storage apparatus 5 to decrease the number of the processors 22 to be allocated to the hosts 3 (S65), and then terminates this second configuration change processing.

Furthermore, if the storage information acquisition unit 41 obtains a negative result in the judgment of step S61, it judges whether the usage capacity of the cache memory 23 allocated to the hosts 3 is smaller than a predefined specified lower limit threshold value or not (S62). Then, if the storage information acquisition unit 41 obtains an affirmative result in this judgment, it issues an instruction to the controller 21 for the storage apparatus 5 to decrease the capacity of the cache memory 23 to be allocated to the hosts 3 (S66), and then terminates this second configuration change processing.

On the other hand, if the storage information acquisition unit 41 obtains a negative result in the judgment of step S62, it judges whether the IOPS of the primary volume RVOL is smaller than a predefined specified lower limit threshold value or not (S63). Then, if the storage information acquisition unit 41 obtains a negative result in this judgment, it terminates this second configuration change processing.

Furthermore, if the storage information acquisition unit 41 obtains an affirmative result in the judgment of step S63, it issues an instruction to the data copy instruction unit 44 (FIG. 3) for the data copy management unit 32 (FIG. 3) to execute the copied data deletion processing for deleting all the high-frequency secondary volume SVOL1 and the host-based secondary volumes SVOL2 and accordingly update the storage routing management table 35 (FIG. 6A or FIG. 6B) (this instruction will be hereinafter referred to as a "copied data deletion processing execution instruction") (S67). Then, the storage information acquisition unit 41 terminates this second configuration change processing.

Figure 15:
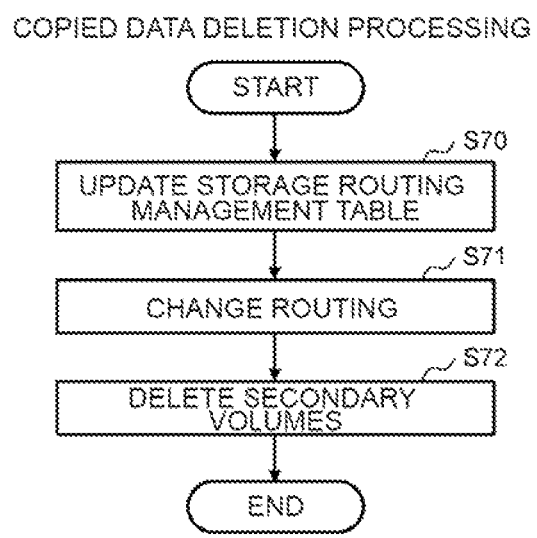
FIG. 15 is a flowchart illustrating a processing sequence for copied data deletion processing.

Now, FIG. 15 illustrates specific processing content of the copy data deletion processing executed by the data copy instruction unit 44 to which the copied data deletion processing execution instruction is given from the storage information acquisition unit 41 in step S67 of the second configuration change processing. The data copy instruction unit 44 deletes the high-frequency secondary volume SVOL1 and each host-based secondary volumes SVOL2 in accordance with the processing sequence illustrated in this FIG. 15, thereby deleting the copied data which are copied to these secondary volumes.

Practically, after receiving the copied data deletion processing execution instruction from the storage information acquisition unit 41, the data copy instruction unit 44 starts the copied data deletion processing illustrated in this FIG. 15 and firstly updates the storage routing management table 35 (FIG. 6A or FIG. 6B) to change the access destination of each piece of the data stored in the high-frequency secondary volume SVOL1 and the host-based secondary volume SVOL2, respectively, from the host 3 to the primary volume RVOL.

Specifically speaking, the data copy instruction unit 44 refers to the data copy management table 36 (FIG. 7), identifies all the data copied to the high-frequency secondary volume SVOL1 or the host-based secondary volumes SVOL2, and identifies all the hosts 3 which have accessed these pieces of data by referring to the data access localization management table 34 (FIG. 5).

Then, the data copy instruction unit 44 changes all the volume ID's stored in the volume ID column 35B, 35BX of entries respectively corresponding to the respective hosts 3 identified as described above in the storage routing management table 35 to the volume ID of the primary volume RVOL (S70).

Subsequently, the data copy instruction unit 44 changes the routing from the hosts 3 to the storage apparatus 5 in a manner similar to step S44 of the data copy processing described earlier with reference to FIG. 12 (S71).

Furthermore, the data copy instruction unit 44 issues an instruction to the controller 21 for the storage apparatus 5 to delete all the high-frequency secondary volume SVOL1 and the host-based secondary volumes SVOL2 which then exist (S72). Consequently, all the copied data which are copied to the high-frequency secondary volume SVOL1 and the host-based secondary volumes SVOL2, respectively, are deleted. Then, the storage information acquisition unit 41 terminates this copied data deletion processing.

(3) Advantageous Effects of this Embodiment

Since the hybrid cloud system 1 according to this embodiment as described above selectively replicates only the high-frequency access data and the specific host localization data in response to the scale-out of the hosts 3 in the public cloud 2, it is possible to curb wasteful consumption of the storage resources required for the replication and promptly replicate the data as compared to the existing technology which replicates all the data. Therefore, with this hybrid cloud system 1, the configuration of the storage apparatus can be dynamically changed in response to the scale-out and the scale-in of the hosts while minimizing the influences affecting the business activities.

Furthermore, this hybrid cloud system 1 is designed so that: each of the high-frequency secondary volume SVOL1 which is a replication destination of the high-frequency access data, and the host-based secondary volumes SVOL2 which are replication destinations of the specific host localization data is provided in a pool PL provided by a RAID group RG which is different from the primary volume RVOL; and the respective host-based secondary volumes SVOL2 are also provided in pools PL provided by respectively different RAID groups RG. So, loads caused by data accesses can be distributed to a plurality of RAID groups RG and then to a plurality of storage devices 20; and this hybrid cloud system 1 can effectively prevent a decrease in data reading/writing speeds attributable to, for example, concentration of the data accesses.

(4) Other Embodiments

Incidentally, the aforementioned embodiment has described the case where the present invention is applied to the hybrid cloud system 1 configured of the hosts 3 in the public cloud 2 and the storage apparatus 5 at the on-premises 4; however, the present invention is not limited to this example and the present invention can be also applied to a case where the hosts 3 exist in a private cloud and the storage apparatus 5 exists at the on-premises 4 and a case where the hosts 3 exist in the public cloud 2 and the storage apparatus 5 exists in a private cloud. In short, as long as the hosts 3 exist in a cloud and the storage apparatus 5 exists at a location other than the above-mentioned cloud, a wide variety of configurations can be applied as the configuration of the hybrid cloud system to which the present invention is applied.

Furthermore, the aforementioned embodiment has described the case where the storage auto-scale processing apparatus 10 and the storage apparatus 5 are formed separately; however, the present invention is not limited to this example and the storage apparatus 5 may be equipped with the functions of the storage auto-scale processing apparatus 10. Furthermore, the public cloud 2 may be also equipped with the functions of the storage auto-scale processing apparatus 10; and furthermore, such functions may be distributed to the storage apparatus 5 and the public cloud 2 or may be distributed to the storage auto-scale processing apparatus 10, the storage apparatus 5, and the public cloud 2.

Furthermore, the aforementioned embodiment has described the case where the high-frequency secondary volume SVOL1 and the respective host-based secondary volumes SVOL2 are set in the pools PL provided by the respectively different RAID groups RG; however, the present invention is not limited to this example and some or all of these secondary volumes may be set in a pool PL provided by one RAID group RG.

INDUSTRIAL AVAILABILITY

The present invention can be applied to the information processing apparatus for managing the configuration of the storage apparatus in the hybrid cloud system.

REFERENCE SIGNS LIST

1: hybrid cloud system
2: public cloud
3: host
4: on-premises
5: storage apparatus
7: switch
10: storage auto-scale processing apparatus
20: storage device
21: controller
22: processor
23: cache memory
25: port
26: CPU
30: auto-scale information notification unit
31: data acquisition unit
32: data copy management unit
33: data access frequency management table
34: data access localization management table
35: storage routing management table
36: data copy management table
40: auto-scale information acquisition unit
41: storage information acquisition unit
42: data access frequency management unit
43: data access localization management unit
44: data copy instruction unit
RG: RAID group
RVOL: primary volume
SVOL1: high-frequency secondary volume
SVOL2: host-based secondary volume
VOL: actual volume
VVOL: virtual volume

The invention claimed is:

1. An information processing apparatus in a hybrid cloud system including hosts provided in a cloud and a storage apparatus which is provided at a location other than the cloud and from and to which the hosts read and write data, the information processing apparatus managing a configuration of the storage apparatus and comprising:
a processor that monitors occurrence of scale-out of the hosts in the cloud, manages access frequency including a number of accesses from the hosts to each piece of the data stored in a first volume the storage apparatus, acquires storage information about a load on the storage apparatus from the storage apparatus, and manages copying of the data in the storage apparatus, wherein, if the processor detects the scale-out of the hosts; and if the processor determines that load status information of any one of resources, that is, a port, the processor, and a cache memory for the storage apparatus, which are allocated to the hosts, exceeds a specified upper limit threshold value, the processor issues an instruction to the storage apparatus to increase a quantity or capacity of the resource; and if the processor determines that the load status information of the any one of resources does not exceed the specified upper limit threshold value, but an IOPS of the first volume exceeds the specified upper limit threshold value, the processor calculates a ratio of a number of times of accesses to each piece of data to a total number of times of accesses to the each piece of data stored in the first volume in the storage apparatus and identifies data regarding which the ratio exceeds a predetermined threshold value, as predetermined-frequency access data; and the processor issues an instruction to the storage apparatus to copy the data the identified predetermined-frequency access data, which is stored in the first volume, to a second volume.

2. The information processing apparatus according to claim 1, wherein the first volume is set in a first RAID (Redundant Arrays of Inexpensive Disks) group configured by a storage area provided by respective storage devices, and wherein the second volume is set in a second RAID group which is configured by a storage area provided by respective storage devices and is different from the first RAID group.

3. The information processing apparatus according to claim 1, wherein the first volume and the second volume are set in one RAID (Redundant Arrays of Inexpensive Disks) group which is configured by a storage area provided by respective storage devices.

4. The information processing apparatus according to claim 1, wherein the processor also monitors occurrence of scale-in of the hosts in the cloud, and wherein if the processor detects the scale-in; and if the processor determines that the load status information of any one of resources, that is, a port, a processor, and a cache memory for the storage apparatus, which are allocated to the hosts, is less than a specified lower limit threshold value, the processor issues an instruction to the storage apparatus to decrease the quantity or capacity of the resource; and if the processor determines that the load status information of the any one of resources does not exceed the specified lower limit threshold value, but the IOPS of the first volume is less than the specified lower limit threshold value, the processor issues an instruction to the storage apparatus to delete the second volume.

5. An information processing method executed by an information processing apparatus in a hybrid cloud system including hosts provided in a cloud and a storage apparatus which is provided at a location other than the cloud and from and to which the hosts read and write data, the information processing apparatus managing a configuration of the storage apparatus and including:

a processor that monitors occurrence of scale-out of the hosts in the cloud, manages access frequency including a number of accesses from the hosts to each piece of the data stored in a first volume in the storage apparatus, acquires storage information about a load on the storage apparatus from the storage apparatus, and manages copying of the data in the storage apparatus, wherein if the processor detects the scale-out of the hosts; and if the processor determines that load status information of any one of resources, that is, a port, the processor, and a cache memory for the storage apparatus, which are allocated to the hosts, exceeds a specified upper limit threshold value, the processor issues an instruction to the storage apparatus to increase a quantity or capacity of the resource; and if the processor determines that the load status information of the any one of resources does not exceed the specified upper limit threshold value, but an IOPS of the first volume exceeds the specified upper limit threshold value, the processor calculates a ratio of a number of times of accesses to each piece of data to a total number of times of accesses to the each piece of data stored in the first volume in the storage apparatus and identifies data regarding which the ratio exceeds a predetermined threshold value, as predetermined-frequency access data; and the processor issues an instruction to the storage apparatus to copy the identified predetermined-frequency access data, which is stored in the first volume, to a second volume.

6. The information processing method according to claim 5, wherein the first volume is set in a first RAID (Redundant Arrays of Inexpensive Disks) group configured by a storage area provided by respective storage devices, and wherein the second volume is set in a second RAID group which is configured by a storage area provided by respective storage devices and is different from the first RAID group.

7. The information processing method according to claim 5, wherein the first volume and the second volume are set in one RAID (Redundant Arrays of Inexpensive Disks) group which is configured by a storage area provided by respective storage devices.

8. The information processing method according to claim 5, wherein the processor also monitors occurrence of scale-in of the hosts in the cloud, and wherein if the processor detects the scale-in; and if the processor determines that the load status information of any one of resources, that is, a port, a processor, and a cache memory for the storage apparatus, which are allocated to the hosts, is less than a specified lower limit threshold value, the processor issues an instruction to the storage apparatus to decrease the quantity or capacity of the resource; and if the processor determines that the load status information of the any one of resources does not exceed the specified lower limit threshold value, but the IOPS of the first volume is less than the specified lower limit threshold value, the processor issues an instruction to the storage apparatus to delete the second volume.

9. A storage apparatus from and to which hosts provided in a cloud read and write data via a network, the storage apparatus comprising a controller that monitors occurrence of scale-out of the hosts in the cloud, manages access frequency including a number of accesses from the hosts to each piece of the data stored in a first volume in the storage apparatus, acquires storage information about a load on the storage apparatus from the storage apparatus, and manages copying of the data in the storage apparatus, wherein if the controller detects the scale-out of the hosts; and if the controller determines that load status information of any one of resources, that is, a port, the controller, and a cache memory for the storage apparatus, which are allocated to the hosts, exceeds a specified upper limit threshold value, the controller causes a quantity or capacity of the resource to be increased; and if the controller determines that the load status information of the any one of resources does not exceed the specified upper limit threshold value, but an IOPS of the first volume exceeds the specified upper limit threshold value, the controller calculates a ratio of a number of times of accesses to each piece of data to a total number of times of accesses to the each piece of data stored in the first volume in the storage apparatus and identifies data regarding which the ratio exceeds a predetermined threshold value, as predetermined-frequency access data; and the controller copies the identified predetermined-frequency access data, which is stored in the first volume, to a second volume.

10. An information processing method executed by a storage apparatus from and to which hosts provided in a cloud read and write data via a network, the storage apparatus including a controller that monitors occurrence of scale-out of the hosts in the cloud, manages access frequency including a number of accesses from the hosts to each piece of the data stored in a first volume in the storage apparatus, acquires storage information about a load on the storage apparatus from the storage apparatus, and manages copying of the data in the storage apparatus, wherein if the controller detects the scale-out of the hosts; and if the controller determines that load status information of any one of resources, that is, a port, the controller, and a cache memory for the storage apparatus, which are allocated to the hosts, exceeds a specified upper limit threshold value, the controller causes a quantity or capacity of the resource to be increased; and if the controller determines that the load status information of the any one of resources does not exceed the specified upper limit threshold value, but an IOPS of the first volume exceeds the specified upper limit threshold value, the controller calculates a ratio of a number of times of accesses to each piece of data to a total number of times of accesses to the each piece of data stored in the first volume in the storage apparatus and identifies data regarding which the ratio exceeds a predetermined threshold value, as predetermined-frequency access data; and the controller copies the identified predetermined-frequency access data, which is stored in the first volume, to a second volume.

* * * * *